United States Patent Office 3,190,885
Patented June 22, 1965

3,190,885
ESTERS OF SUBSTITUTED N-OXAZOLIDINONES
AND DERIVATIVES THEREOF
Richard A. Hickner, Midland, Mich., assignor to The
Dow Chemical Company, Midland, Mich., a corporation of Delaware
No Drawing. Filed Apr. 10, 1963, Ser. No. 271,862
11 Claims. (Cl. 260—307)

This application is a continuation-in-part of my applications Serial No. 56,352, filed September 16, 1960, and Serial No. 135,741, filed September 5, 1961, both now abandoned.

This invention relates to new chemical compounds which are esters of N-substituted oxazolidinones and to a method for preparing such compounds.

Hereinafter, the term "oxazolidinone ester(s)" will be used to denote compound(s) prepared by acylating an N-oxyalkylene- or N-polyoxyalkylene-oxazolidinone, and the term "epoxidized ester(s)" will be used to identify compound(s) prepared by epoxidizing unsaturated oxazolidinone esters.

The oxazolidinone esters of the present invention are those having the formula:

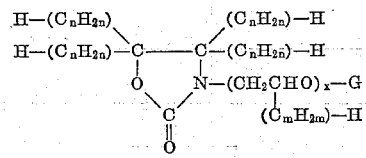

wherein $m$ is a number from 0 to 2, $n$ is a number from 0 to 4, $x$ is an integer from 1 to about 20, and G is the acyl group of an alkanoic, epoxyalkanoic or alkenoic monocarboxylic acid containing from 2 to 22 carbon atoms. More specifically, a preferred aspect of the present invention pertains to the class of compounds wherein G represents the acyl group of an alkanoic, epoxyalkanoic or alkenoic monocarboxylic acid containing 6 to 18 carbon atoms, and where said alkenoic acids contain from 1 to 4 sites of ethylenic unsaturation. A particularly desirable class of compounds is that wherein G represents the acyl group of an alkanoic acid containg from 6 to 10 carbon atoms.

The alkanoic and alkenoic oxazolidinone esters of the present invention are conveniently prepared by reacting by contacting, an oxyalkylene- or polyoxyalkylene-oxazolidinone having the formula:

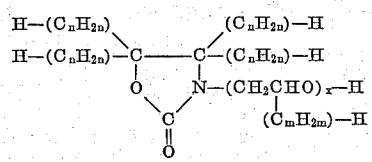

wherein $m$, $n$, and $x$ each have the same significance as hereinbefore described, with a suitable acylating agent under acylating conditions. In one convenient method the reactants and catalyst, if any, are mixed and the mixture heated at an elevated temperature for a period of time sufficient to cause substantially complete esterification; normally, heating at the reflux temperature for 4–6 hours is sufficient to complete the reaction. The water produced in the reaction, if any, is suitably removed as an azeotrope with an inert solvent which forms an azeotrope with water. Neutralization of the reaction mixture, when necessary, is suitably effected by an alkaline material, such as, for example, anhydrous ammonia or a basic ion-exchange resin. The desired product may then be purified by distillation, if desired.

The acylating agent employed as a reactant is conveniently selected from the group of acyl chlorides, acid anhydrides, and aliphatic carboxylic acids.

The acid catalyst employed, if any, is one chosen from a group of known strong acids. Sulfuric acid, hydrochloric acid, toluene sulfonic acid and strong acid ion-exchange resins are examples of operable strong acids.

The solvent used in the reaction mixture, if any, may be any suitable inert solvent and preferably one that forms an azeotrope with water. Examples of suitable solvents are benzene, toluene, and perchloroethylene.

The ratio of acylating agent to oxyalkylene- or polyoxyalkyleneoxazolidinone will vary depending upon the boiling points of the reactants and reaction products. For example, when preparing oxazolidinone acetate and propionate esters an excess of acid is often desirable since the boiling point of the oxazolidinone approximates that of the resulting ester. As an additional example, an excess of acylating agent is desirable for the esterification of 3-(2-hydroxyethyl)-2-oxazolidinone as the oxazolidinone is insoluble in many aromatic hydrocarbons, and an excess of acylating agent is desirable in order to effect solubility of the oxazolidinone. In numerous other instances, however, the stoichiometric ratio is preferred.

In general, the oxazolidinone esters of the present invention are soluble in aromatic hydrocarbons, alcohols, or ketones. Those containing three carbons or less in the acyl portion are freely miscible with water, while those containing five or more carbon atoms in the acyl portion are readily soluble in aliphatic hydrocarbons.

In each of a series of experiments, an oxyalkylene- or polyoxyalkyleneoxazolidinone and an acrylating agent were mixed and reacted, catalytic amounts of a strong acid, such as sulfuric acid, being added when the acylating agent was a carboxylic acid; from 1 to 5 ml. of sulfuric acid were sufficient in every instance. The mixture was heated to about the reflux temperature and maintained thereat for 4–6 hours. The reaction mixture was neutralized, when necessary, with anhydrous ammonia, and the oxyalkylene- or polyoxyalkyleneoxazolidinone ester removed from the reaction mixture, usually by distillation. The quantity of reactants employed varied from 0.2 to 3.0 g. moles throughout the series of experiments and the reactants were employed in approximately their stoichiometric ratios. There are shown in Table I the reactants employed, the oxazolidinone ester prepared and the yield based on the amount of acylating agent used, the boiling points or melting points and the refractive indices of the products, and other pertinent properties.

TABLE I

| Example | 2-oxazolidinone | Acylating agent | Ester | Yield, percent | B.P., °C | $N_D^{25}$ | Other properties |
|---|---|---|---|---|---|---|---|
| 1 | 3-(2-hydroxyethyl) | Glacial acetic acid | Acetate | 72 | 118–120 at 0.5 mm. | | |
| 2 | 3-(2-hydroxyethyl)-5-methyl | ___do___ | ___do___ | 70 | 118–120 at 1 mm. | 1.4580 | |
| 3 | 3-(2-hydroxypropyl)-5-methyl | Acetic anhydride | ___do___ | 50 | 123–126 at 0.5 mm. | 1.4544 | |
| 4 | 3-(2-hydroxyethyl)-5-methyl | Propionic acid | Propionate | 57 | 121–123 at 0.3 mm. | 1.4560 | |
| 5 | ___do___ | n-Hexanoic acid | Hexanoate | 63 | 147–151 at 1 mm. | 1.4570 | |
| 6 | ___do___ | n-Heptanoic Acid | Heptanoate | 76 | 153–155 at 0.5 mm. | 1.4570 | |
| 7 | ___do___ | n-Octanoic acid | Octanoate | 64 | 153–157 at 0.2 mm. | 1.4576 | |
| 8 | ___do___ | Pelargonic acid | Pelargonate | 80 | | 1.4572 | |
| 9 | ___do___ | n-Decanoic acid | Decanoate | 67 | 178–181 at 0.5 mm. | 1.4580 | |
| 10 | ___do___ | Lauric acid | Laurate | 61 | 180–184 at 0.5 mm. | 1.4585 | |
| 11 | ___do___ | Myristic acid | Myristate | | 200–205 at 2 mm. | 1.4600 | |
| 12 | ___do___ | Palmitic acid | Palmitate | 64 | 210–215 at 0.5 mm. | | |
| 13 | ___do___ | Stearic acid | Stearate | | 180–185 at 0.4 mm. | | |
| 14 | ___do___ | Oleic acid | Oleate | 62 | 235–240 at 0.25 mm. | 1.4674 | |
| 15 | 3-(2-hydroxyethyl)- | Acrylic acid | Acrylate | 70 | 140–145 at 0.4 mm. | 1.4803 | |
| 16 | ___do___ | Methacrylic acid | Methacrylate | 63 | 147–150 at 0.5 mm. | 1.4810 | |
| 17 | 3-(2-hydroxyethyl)-5-methyl- | Acrylic acid | Acrylate | 50 | 141–145 at 0.3 mm. | 1.4735 | |
| 18 | ___do___ | Methacrylic acid | Methacrylate | 48 | 148–151 at 1 mm. | 1.5720 | |
| 19 | 3-(2-hydroxypropyl)-5-methyl | Acrylic acid | Acrylate | 67 | 140–143 at 0.1 mm. | 1.4682 | |
| 20 | ___do___ | Methacryloyl chloride | Methacrylate | 70 | 110–120 at 0.1–0.2 mm. | 1.4688 | |
| 21 | 3-[(CH$_2$CH$_2$O)$_5$-H]-5-methyl | n-Octanoic acid | Octanoate | 69 | (*) | | Pale yellow liquid. |
| 22 | ___do___ | Palmitic acid | Palmitate | 41 | (*) | | Light brown liquid. |
| 23 | ___do___ | Oleic acid | Oleate | 76 | (*) | 1.4672 | |
| 24 | ___do___ | Stearic acid | Stearate | 54 | (*) | | Light yellow liquid. |
| 25 | 3-[(CH$_2$CHO)$_{15}$-H]-5-methyl<br>        CH$_3$ | Acetyl chloride | Acetate | | (*) | 1.4513 | |
| 26 | 3-[(CH$_2$CHO)$_8$-H]-5-methyl<br>        C$_2$H$_5$ | Acetyl Chloride | ___do___ | | (*) | 1.4544 | |

*This ester could not be distilled.

The novel oxazolidinone esters of the present invention possess varied and unexpected utilities, the utility of any particular compound depending partially upon its chemical structure. Some of the novel compounds are excellent solvents or plasticizers for polyvinyl chloride; the esters of 3-(2-hydroxyethyl)-5-methyl-2-oxazolidinone containing from 2 to 6 carbon atoms in the acyl portion of the molecule, for example, are useful as solvents for polyvinyl chloride, while those esters of oxalkylene- or polyoxyalkyleneoxazolidinones containing from 1 to about 15 oxyalkylene groups and from 2 to about 18 carbon atoms in the acyl portion of the molecule are excellent plasticizers for polyvinyl chloride.

The novel esters are much more satisfactory as plasticizers than is the hydroxyethyl oxazolidinone benzoate ester, a known compound. The plasticized PVC films prepared from the novel esters remain clear and do not exude plasticizer even after several weeks after preparation, while the films prepared from the hydroxyethyl benzoate ester exude plasticizer freely within a few hours after preparation and possess a permanently cloudy appearance on the surface of the film. The utility of the novel esters as plasticizers was demonstrated by a series of experiments wherein a series of polyvinyl chloride formulations were prepared in each of which there were mixed 51.5 grams of stabilized polyvinyl chloride and 32.5 grams of a 3-(2-hydroxyethyl)-5-methyl-2-oxazolidinone ester and the mixture was thoroughly milled. There are shown in Table II the tensile strength, percent elongation, and Shore A Hardness of the films prepared from the resultant plasticized resins, $x$ representing the number of oxyethylene groups contained in the ester.

TABLE II

| $x$ | Ester | Tensile strength, lbs./sq. in. | Elongation | Shore A hardness |
|---|---|---|---|---|
| 1 | Propionate | 1,710 | 598 | 69 |
| 1 | n-Hexanoate | 1,220 | 477 | 62 |
| 1 | n-Octanoate | 1,395 | 536 | 64 |
| 1 | n-Deconoate | 1,493 | 390 | 64 |
| 1 | Myristate | 2,160 | 420 | 76 |
| 1 | Palmitate | 2,048 | 306 | 69 |
| 1 | Stearate | 2,001 | 443 | 78 |
| 1 | Oleate | 2,043 | 520 | 75 |
| 1 | Acrylate | 2,082 | 480 | |
| 1 | Methacrylate | 1,814 | 422 | |
| 5 | n-Octanoate | 1,931 | 472 | 71 |
| 5 | Palmitate | 1,900 | 480 | 75 |
| 5 | Stearate | 2,017 | 560 | 75 |
| 5 | Oleate | 1,874 | 460 | 75 |

The utility of the novel esters as plasticizers was further demonstrated by a second series of experiments in which a series of polyvinyl chloride formulations were prepared, each of which contained 103 parts by weight of stabilized polyvinyl chloride and from 45–55 parts by weight of an ester of a 3-(2-hydroxyethyl)-2-oxazolidinone. The formulations were milled and were rolled on a two roll mill to thin sheets. Molded sheets were prepared and inspected immediately after being molded, and at regular intervals thereafter for several weeks, to determine their appearance and general condition. Each of the moldings prepared from the acetate, heptanoate, decanoate, and oleate esters, when subjected to test, showed an elongation of over 500% and showed no evidence of exudation of the plasticizer even after several weeks of aging. The molding prepared from the resin containing the known benzoate ester of 3-(2-hydroxyethyl)-2-oxazolidinone, however, exuded plasticizer freely within twelve hours after molding, resulting in a greasy, permanently cloudy film on the surface of the molding, showing the completely unsatisfactory product resulting from this use.

The superior performance of the esters of the present invention over the known benzoate ester, as a plasticizer for polyvinyl chloride, extends to low temperature uses also. Molded sheets prepared from PVC and plasticized with the novel esters, after being stored for 18 hours at —30° C., can be flexed repeatedly without fracturing. Sheets prepared likewise but containing the known benzoate ester as a plasticizer, fractured upon being flexed once, after being stored under the same conditions.

The alkanoic oxazolidinone esters of the present invention having from about 6 to about 18 carbon atoms in the acyl portion of the molecule show considerable surface activity and thus are valuable as antifoam agents. As an illustration of this valuable property, a series of experiments was conducted, in each of which a 100-ml. graduated cylinder was charged with 50 ml. of distilled water, 0.5 gram of a high-foaming synthetic detergent and 1.0 gram of an ester of 3-(2-hydroxyalkyl)-5-methyl-2-oxazolidinone. Each cylinder was then shaken for 30 seconds and the foam heights were observed after 30 seconds, 5 minutes and 30 minutes. There are shown in the following table for each experiment the particular ester used and the foam heights observed. In each instance the ester contained one oxyethylene group except where otherwise noted.

TABLE III

| Experiment | Ester of 3-(2-hydroxyalkyl)-5-methyl-2-oxazolidinone | Foam heights (cm.) | | |
|---|---|---|---|---|
| | | 30 sec. | 5 min. | 30 min. |
| 1 | Blank | 12 | 11 | 10.5 |
| 2 | Benzoate [1] | 12.5 | 11.5 | 11 |
| 3 | Acetate [2] | 3 | 0.5 | 0 |
| 4 | Hexanoate | 6.5 | 3 | 0.5 |
| 5 | Heptanoate | 3.5 | 0 | 0 |
| 6 | Octanoate | 4.5 | 2.5 | 1 |
| 7 | Tallate | 1.5 | 1 | 1 |
| 8 | Oleate [3] | 1.5 | 1 | 1 |

[1] Ester of 3-(2-hydroxyethyl)-2-oxazolidinone.
[2] Containing 15 oxypropylene groups.
[3] Containing 5 oxyethylene groups.

In addition to the compounds hereinbefore disclosed, other 2-oxazolidinone esters within the scope of the present invention can be similarly prepared from the corresponding oxalkylene- and polyoxyalkyleneoxazolidinones, such as, for example, 3-(2-hydroxyethyl)-4-methyl-2-oxazolidinone propionate,
3-(2-hydroxyethyl)-4-n-propyl-2-oxazolidinone laurate,
3-(2-hydroxypropyl)-4,5-diethyl-2-oxazolidinone pelargonate,
3-(2-hydroxyethyl)-4-n-butyl-2-oxazolidinone palmitate,
3-(2-hydroxyethyl)-4-n-propyl-4-methyl-2-oxazolidinone palmitate,
3-(2-hydroxyethyl)-4-ethyl-5-methyl-5-n-butyl-2-oxazolidinone octanoate,
3-(2-hydroxybutyl)-4-ethyl-5-n-propyl-2-oxazolidinone acetate,
3-[(CH$_2$CH$_2$O)$_{15}$-H]-5-methyl-2-oxazolidinone octanoate,
3-[(CH$_2$CHO)$_{20}$-H]-2-oxazolidinone decanoate,
    |
    CH$_3$
3-[(CH$_2$CH$_2$O)$_{20}$-H]-2-oxazolidinone propionate,
3-(2-hydroxypropyl)-5-methyl-2-oxazolidinone linoleate,
3-[(CH$_2$CH$_2$O)$_{15}$-H]-2-oxazolidinone linoleate,
3-(2-hydroxyethyl)-4-ethyl-2-oxazolidinone linolenate,
3-[(CH$_2$CHO)$_{20}$-H]-5-methyl-2-oxazolidinone linolenate,
    |
    CH$_3$ and the like.

The oxyalkylene- and polyoxyalkyleneoxazolidinones employed as reactants for preparing the novel oxazolidinone esters are conveniently prepared by reacting, by contacting, a 2-oxazolidinone having the formula:

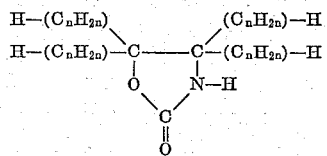

wherein $n$ is a number from 0 to 4, with from 1 to about 20 moles, per mole of oxazolidinone, of an alkylene oxide containing 2 to 4 carbon atoms. The reaction is suitably carried out at a temperature of from 90° to about 180° C. and a pressure of 2–10 atmospheres, preferably at about 110°–145° C. and 3–5 atmospheres. Normally 2–4 hours are required for completion of the reaction, after which any unreacted alkylene oxide is conveniently removed from the reaction vessel by reducing the pressure to subatmospheric. The 2-oxazolidinone product may then be purified by distillation or otherwise if desired.

Where it is desired to prepare a polyoxyalkyleneoxazolidinone, it is preferable to employ from about 0.1 to 10 percent by weight, based on the weight of the reactants, of a strong alkaline catalyst. Suitable catalysts for the reaction include alkali metal hydroxides, an alkali metal salt of the oxazolidinone, and a quaternary ammonium hydroxide. The 2-oxazolidinone product may then be neutralized by suitable means, such as for example, with acetic acid.

The epoxidized esters of the present invention are those having the formula:

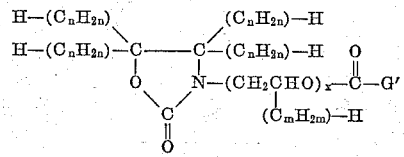

wherein each $n$ is a number from 0 to 4, $m$ is a number from 0 to 2, $x$ is an integer from 1 to about 20, and G is an epoxyalkyl radical containing from 2 to 21 carbon atoms and from 1 to 4 epoxy groups, and mixtures of these compounds.

The novel epoxidized esters are conveniently prepared by epoxidizing a substituted oxazolidinone ester having the formula:

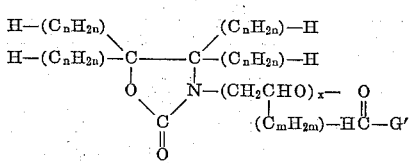

where $m$, $n$ and $x$ have the same significance as previously described and G' is the hydrocarbon residue of an olefinically unsaturated carboxylic acid having from 3 to 22 carbon atoms and from 1 to 4 sites of olefinic unsaturation. The epoxidation can be accomplished by any of several known methods employing known epoxidation agents; one convenient method consists of adding peracetic acid to the oxazolidinone ester, desirably in an inert solvent, such as benzene, chloroform and methylene chloride and allowing these components to react at about room temperature, i.e., about 20–25° C. for 2–4 hours, and heating the reaction mixture at not more than 80° C., preferably at 55–60° C. for a short period of time. The organic phase of the reaction mixture can then be washed with water and diluted alkali, and the desired product removed from the organic phase, conveniently by distillation of the solvent.

It is to be understood that the oxazolidinone ester used as a starting material may be either a pure compound or a mixture containing compounds having one to four sites of ethylenic unsaturation.

The epoxidized esters have shown excellent utility as stabilizers and plasticizers for polyvinyl chloride. The utility as a stabilizer was demonstrated in a series of experiments wherein three polyvinyl chloride formulations were prepared by milling 100 grams of polyvinyl chloride with 40–50 grams of plasticizer and 1.7 grams of a barium cadmium stabilizer. The first formulation contained 50 grams of dioctyl phthalate, a known plasticizer, the second contained 45 grams of the epoxidized tall oil fatty acid ester of 3-(2-hydroxyethyl)-5-methyl-2-oxazolidinone, and the third 42.5 grams of the epoxystearate ester of 3-(2-hydroxyethyl)-5-methyl-2-oxazolidinone. The formulations were molded by heating in a hydraulic press for one hour at 360° F. and 30,000 p.s.i. Upon removal and inspection of the moldings, it was found that the first formulation had become dark brown while the other two remained a pale yellow. The latter two formulations (moldings) were returned to the press and subjected for an additional hour to the same temperature and pressure as before. Upon removal and inspection, it was found that the two moldings were still a pale yellow color.

The utility of these novel compounds as plasticizers for polyvinyl chloride is demonstrated further by a second series of experiments in which two polyvinyl chloride formulations were prepared. Each formulation contained 100 grams of polyvinyl chloride and 2.5 grams of a barium-cadmium stabilizer (12–V–6, Harshaw Chemical Co.). The first formulation contained 45 grams of the epoxidized tall oil fatty acid ester of 3-(2-hydroxyethyl)-5-methyl-2-oxazolidinone and the second formulation contained 43 grams of the epoxystearate ester of 3-(2-hydroxyethyl)-5-methyl-2-oxazolidinone. The formulations were each milled at 360° F. for seven minutes and then flash molded into films .017 inch in thickness. The Shore A Hardness, tensile strength and elongation were determined on each of the plasticized resins, as shown in Table IV.

TABLE IV

| Sample | Shore A hardness | Tensile strength, lbs./in.² | Elongation, percent |
| --- | --- | --- | --- |
| 1 | 75 | 3,355 | 450 |
| 2 | 75 | 3,400 | 495 |

These properties were comparable to those determined on formulations containing plasticizers known to be effective, in place of the compounds of the present invention.

*Example 27*

72.5 grams (0.5 mole) of 3-(2-hydroxyethyl)-5-methyl-2-oxazolidinone, 99.4 grams (0.54 mole) of 10-undecenoic acid, and 3 ml. of concentrated $H_2SO_4$ were mixed with 250 ml. of benzene and the mixture was refluxed until no more water was removed. The reaction mixture was cooled and to it were added 30 grams of sodium acetate and, dropwise, 110 grams of 40 percent peracetic acid, while maintaining the temperature below 25° C. The reaction mixture was then stirred overnight while being allowed to warm to room temperature. The excess peracetic acid was destroyed with sodium bisulfite and the reaction mixture was washed with aqueous sodium hydroxide solution and dried over anhydrous sodium sulfate. The benzene was removed under reduced pressure to produce 94.2 grams (58 percent of the theoretical yield) of the 10,11-epoxyundecanoic ester, a pale yellow liquid having $n_D^{25}$ of 1.4706.

*Example 28*

A solution of 102 grams (0.25 mole) of the tall oil fatty acid ester of 3-(2-hydroxyethyl)-5-methyl-2-oxazolidinone in 200 ml. of benzene was placed in a three-necked flask fitted with a stirrer, thermometer, condenser, and dropping funnel. Three and one-half grams of anhydrous sodium acetate were added, followed by 76 grams of a 40 weight percent solution of peracetic acid in acetic acid which was added dropwise at 20–25° C. The mixture was agitated continuously for three hours at this temperature and then was heated at 55–60° C. for an additional hour. The organic layer was then washed successively with water, dilute sodium hydroxide and again with water until neutral to litmus. The benzene layer was dried over anhydrous sodium carbonate and filtered. The solvent was then removed by distillation at 110° C. and 0.5 mm. pressure. The product, the epoxidized tall oil fatty acid ester of 3-(2-hydroxyethyl)-5-methyl-2-oxazolidinone was a nearly colorless liquid having $n_D^{25}$ of 1.4707, an iodine value of 2.41 and an oxirane content of 5.35 percent, as determined by hydrobromic acid titration in acetic acid.

*Example 29*

The process of Example 28 was repeated using 204 grams (0.5 mole) of the oleate ester of 3-(2-hydroxyethyl)-5-methyl-2-oxazolidinone and 104 grams (0.55 mole) of 40 weight percent peracetic acid. The product, the 9,10-epoxystearic ester of 3-(2-hydroxyethyl)-5-methyl-2-oxazolidinone was a pale yellow liquid having $n_D^{25}$ of 1.4671, a freezing point of 7° C. and a viscosity of 132.9 centistokes at 25° C.

*Example 30*

315 grams (0.46 mole) of the oleic ester of N-polyoxybutyleneoxazolidinone containing approximately 4 oxybutylene groups was reacted in a manner similar to that of Examples 27 and 28 to prepare the corresponding epoxidized ester. There were obtained 287 grams of product having $n_D^{25}$ of 1.4450.

*Example 31*

433 grams (0.96 mole) of the ester prepared by reacting 3-(2-hydroxethyl)-5-methyl - 2 - oxazolidinone with ADM 505 (a mixture of fatty acids containing approximately 22 percent oleic acid, 17 percent linoleic acid, 51 percent linolenic acid, 5.5 percent palmitic acid and 4 percent stearic acid, Archer-Daniels Midland Co.) was reacted with 337 grams of 40 percent peracetic acid in a manner similar to that of Examples 27–30. The epoxidized ester mixture produced had $n_D^{25}$ of 1.4732 and an oxirane content of 6.44 percent.

*Example 32*

315 grams (0.46 mole) of the tall ester of 3-[2-(oxybutylene)₅]-5-methyl-2-oxazolidinone was reacted, in a manner similar to that of the preceding examples, with 2.8 grams of sodium acetate and 152 grams of peracetic acid in 200 ml. of benzene. The reaction was run at room temperature for 2–3 hours and then at 55–60° C. for 1 hour, and the product isolated as in the previous examples. A light brown liquid was obtained having $n_D^{25}$ of 1.4450.

In addition to the compounds employed as starting materials in the preceding examples other unsaturated oxazolidinone esters may be used to prepare the corresponding epoxidized ozazolidinone esters, such as, for example, the oleate ester of 3-(2-hydroxypropyl)-4,5-diethyl-2-oxazolidinone, the erucic ester of 3-(2-hydroxybutyl)-4-methyl-5-ethyl-2-oxazolidinone, the linoleate ester of 3-(2-hydroxypropyl)-4,5-di-n-propyl-2-oxazolidinone, the linolenic ester of 3-(2-hydroxypropyl)-4,5-di-sec-butyl-2-oxazolidinone, the palmitoleic ester of 3-(2-hydroxypropyl)-4-methyl-5-ethyl-2-oxazolidinone, the gadoleic ester of 3-(2-hydroxyethyl)-4,5-dimethyl-2-oxazolidinone, the eleostearic ester of 3-(2-hydroxypropyl)-4,5-diethyl-2-oxazolidinone, the ricinoleic ester of 3-(2-hydroxybutyl)-5-methyl-2-oxazolidinone, the arachidonic ester of 3-(2-hydroxypropyl)-4,5-dimethyl-2-oxazolidinone, the oleic ester of 4,5-dimethyl-2-oxazolidinone containing 6 oxyethylene groups, the linoleate ester of 4-methyl-5-ethyl-2-oxazolidinone containing 7 oxypropylene groups, the linolenic ester of 4,5-di-n-propyl-2-oxazolidinone containing 9 oxypropylene groups, and the arachidonic ester of 5-methyl-2-oxazolidinone containing 10 oxybutylene groups.

I claim:
1. A compound having the formula:

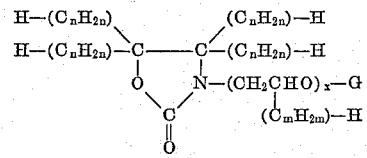

wherein $m$ is a number from 0 to 2, $n$ is a number from 0 to 4, $x$ is an integer from 1 to about 20, and G is the acyl group of a monocarboxylic acid selected from the class consisting of alkanoic acids, alkenoic acids having from 1 to 4 sites of ethylenic unsaturation, and epoxyalkanoic acids and containing from 6 to 18 carbon atoms.

2. A compound as in claim 1 wherein G is the acyl group of an alkanoic acid containing from 6 to 18 carbon atoms.

3. A compound as in claim 1 wherein G is the acyl group of an alkenoic acid having from 1 to 4 sites of ethylenic unsaturation and containing from 6 to 18 carbon atoms.

4. A compound as in claim 1 wherein G is the acyl group of an epoxyalkanoic acid containing from 6 to 18 carbon atoms.

5. A compound as in claim 1 wherein G is the acyl group of an alkanoic acid containing from 6 to 10 carbon atoms.

6. A compound as in claim 1 wherein G is the epoxidized hydrocarbon residue of linoleic acid.

7. A compound as in claim 1 wherein G is the epoxidized hydrocarbon residue of linolenic acid.

8. The epoxyundecanoic ester of 3-(2-hydroxyethyl)-5-methyl-2-oxazolidinone.

9. The epoxystearic ester of 3-(2-hydroxyethyl)-5-methyl-2-oxazolidinone.

10. The epoxidized linoleate ester of 3-(2-hydroxyethyl)-5-methyl-2-oxazolidinone.

11. The epoxidized linolenate ester of 3-(2-hydroxyethyl)-5-methyl-2-oxazolidinone.

References Cited by the Examiner
UNITED STATES PATENTS
2,755,286   7/56   Bell et al. _____ 260—307.3

OTHER REFERENCES

Becco Bulletin No. 69, "Epoxidation and Hydroxylation with Becco Hydrogen Peroxide and Peracetic acid" (Food Machinery and Chem. Corp., New York, 1956).

Buttrey, Plasticizers (London, 1958), pages 4–46, 49–52, 80–88, and 196–199.

NICHOLAS S. RIZZO, *Primary Examiner.*

WALTER A. MODANCE, *Examiner.*

UNITED STATES PATENT OFFICE
CERTIFICATE OF CORRECTION

Patent No. 3,190,885                         June 22, 1965

Richard A. Hickner

It is hereby certified that error appears in the above numbered patent requiring correction and that the said Letters Patent should read as corrected below.

Column 6, lines 48 to 54, for that portion of the formula reading

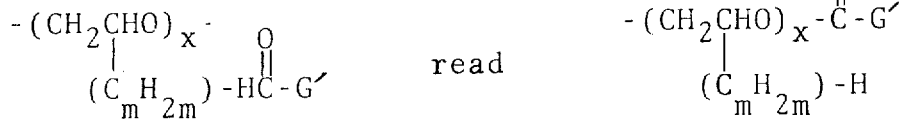

column 10, line 24, for "4-46" read -- 44-46 --.

Signed and sealed this 28th day of December 1965.

(SEAL)
Attest:

ERNEST W. SWIDER                          EDWARD J. BRENNER

Attesting Officer                             Commissioner of Patents